United States Patent
Yeh et al.

(10) Patent No.: US 8,243,433 B2
(45) Date of Patent: Aug. 14, 2012

(54) COMPUTER WITH POWER SUPPLY UNIT AND STORAGE HOLDER

(75) Inventors: Chin-Wen Yeh, Taipei Hsien (TW); Zhen-Neng Lin, Shenzhen (TW)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 396 days.

(21) Appl. No.: 12/478,056

(22) Filed: Jun. 4, 2009

(65) Prior Publication Data
US 2010/0259883 A1    Oct. 14, 2010

(30) Foreign Application Priority Data
Apr. 8, 2009  (CN) ............ 2009 2 0301996 U

(51) Int. Cl.
  *H05K 5/00* (2006.01)
  *H05K 7/00* (2006.01)
(52) U.S. Cl. ........ 361/679.33; 361/679.02; 361/679.35; 361/679.37; 361/679.38; 361/679.39
(58) Field of Classification Search ............ 361/679.02, 361/679.33, 679.35, 679.37, 679.38, 679.39, 361/679.58, 679.6
See application file for complete search history.

(56) References Cited

U.S. PATENT DOCUMENTS

| | | | |
|---|---|---|---|
| 2005/0135069 A1* | 6/2005 | King et al. | 361/727 |
| 2005/0185372 A1* | 8/2005 | Chen et al. | 361/685 |
| 2005/0185373 A1* | 8/2005 | Chen et al. | 361/685 |
| 2006/0164803 A1* | 7/2006 | Chen et al. | 361/685 |
| 2008/0116774 A1* | 5/2008 | Chen et al. | 312/223.2 |
| 2008/0137280 A1* | 6/2008 | Chen et al. | 361/685 |

* cited by examiner

*Primary Examiner* — Anthony Haughton
(74) *Attorney, Agent, or Firm* — Altis Law Group, Inc.

(57) ABSTRACT

A computer includes a chassis, a combination of a power supply unit and a storage holder formed at a top of the power supply unit attached to the chassis, a hard disk drive held in the storage holder, and a securing member. The hard disk drive includes at least a fixing post and a Serial Advanced Technology Attachment connector positioned at an open end of the storage holder. The securing member is pivotably attached to the storage holder for engaging with the fixing post of the hard disk drive and securing the hard disk drive in the storage holder.

9 Claims, 3 Drawing Sheets

COMPUTER WITH POWER SUPPLY UNIT AND STORAGE HOLDER

BACKGROUND

1. Technical Field

The present disclosure relates to a computer including a combination of a power supply unit and a storage holder for holding a hard disk drive.

2. Description of Related Art

In a typical computer main body, a power supply unit and a storage holder are independent components. The storage holder for holding a hard disk drive may be positioned below the power supply unit. The power supply unit has to be moved upwards to allow a hard drive to be installed in or removed from the storage holder. The SATA (Serial Advanced Technology Attachment) connector of the hard disk drive is positioned at one side of the hard disk drive adjacent to and covered by a side panel of the computer main body. Thus, long and flexible SATA cables extending from an interspace between the storage holder and the side panel have to be utilized to connect the SATA connector of the hard disk drive to a corresponding SATA connector on a motherboard of the computer, which wastes materials and is inconvenient.

Thus, a computer that overcomes the above-mentioned problems is desired.

DETAILED DESCRIPTION OF THE EMBODIMENTS

Figure 1:
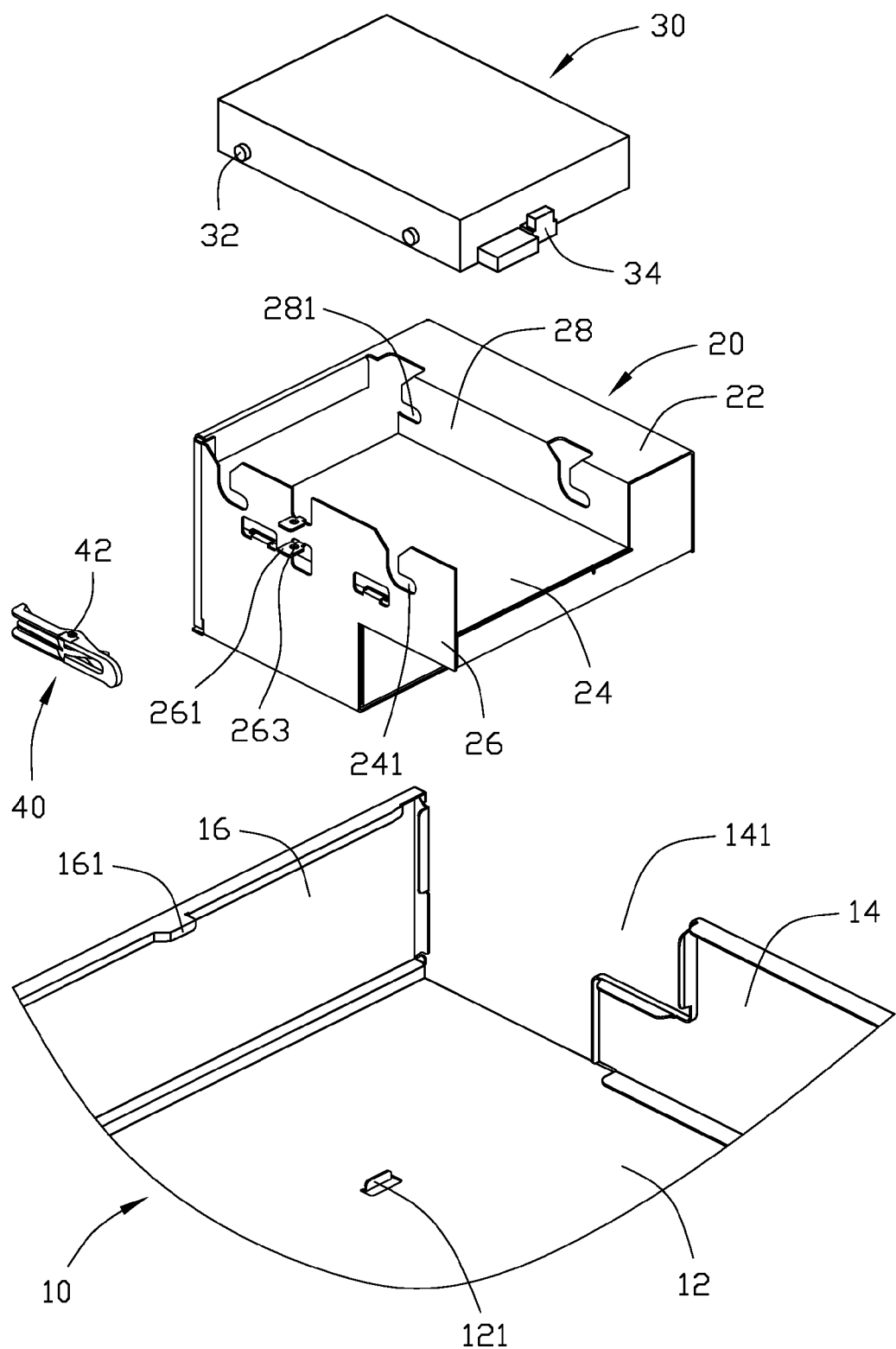
FIG. 1 is an exploded, isometric view of an embodiment of a computer, the computer a chassis, a combination of a power supply unit and a storage holder, a hard disk drive, and a securing member.

Referring to FIG. 1, an embodiment of a computer includes a chassis 10, a hard disk drive 30, a combination 20 of a power supply unit 22 and a storage holder 24 formed at a top of the power supply unit 22 for holding the hard disk drive 30, and a securing member 40 for securing the hard disk drive 30 in the storage holder 24.

The chassis 10 includes a base panel 12, a rear panel 14 extending upward perpendicularly from a rear edge of the base panel 12, and a side panel 16 extending upward perpendicularly from a side edge of the base panel 12. The base panel 12, the rear panel 14, and the side panel 16 of the chassis 10 are perpendicular to each other. An opening 141 is defined in the rear panel 14. The opening 141 comprises an upper wider portion and a lower narrower portion corresponding to the power supply unit 22. The base panel 12 comprises a first limiting piece 121 extending upward and perpendicularly therefrom. The side panel 16 comprises a second limiting piece 161 perpendicular to the first limiting piece 121.

The combination 20 includes a first side panel (not labeled) and a second side panel 26 opposite to the first side panel. An upper portion of the second side panel 26 of the combination 20 functions as a side panel of the storage holder 24 and defines a pair of L-shaped guide slots 241 therein. Another side panel 28 of the storage holder 24 also defines a pair of L-shaped guide slots 281 therein. A pair of securing pieces 261 protrudes from between the guide slots 241 on the side panel 26. Each of the securing pieces 261 defines a pivot hole 263 therein.

The hard disk drive 30 includes two pair of fixing posts 32 protruding outwards from two side panels thereof and a SATA connector 34 protruding outwards from a rear panel thereof for connecting with a corresponding SATA connector on a motherboard (not shown) in the chassis 10.

Figure 2:
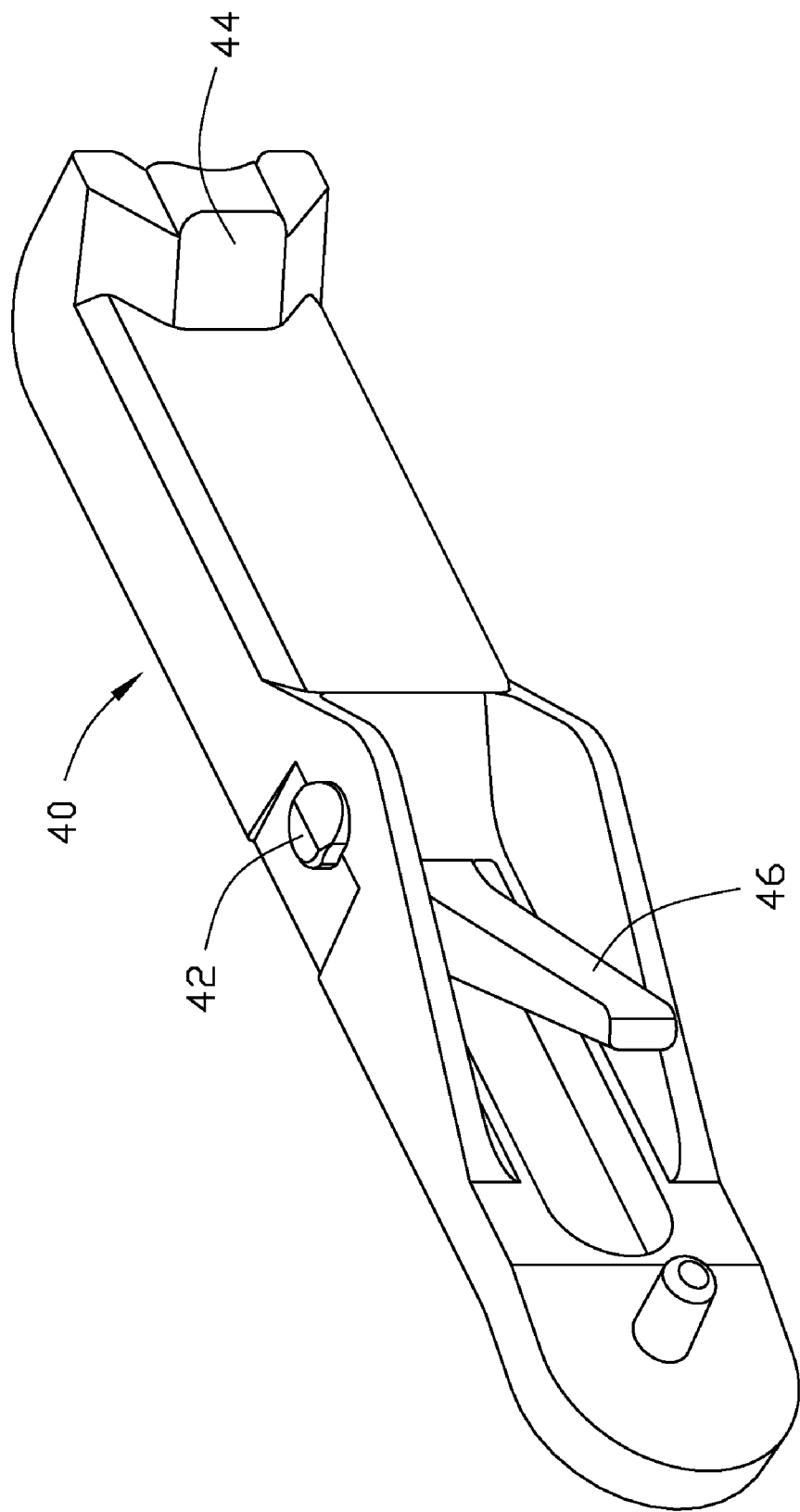
FIG. 2 is another view of the securing member of FIG. 1.

Referring also to FIG. 2, the securing member 40 includes a pair of pivot posts 42, a hook 44 bent from one distal end thereof, and a resilient piece 46 extending slantwise from an inner central portion of the securing member 40 towards another distal end of the securing member 40. The pivot posts 42 protrude from upper and lower flanges at a central portion of the securing member 40.

Figure 3:
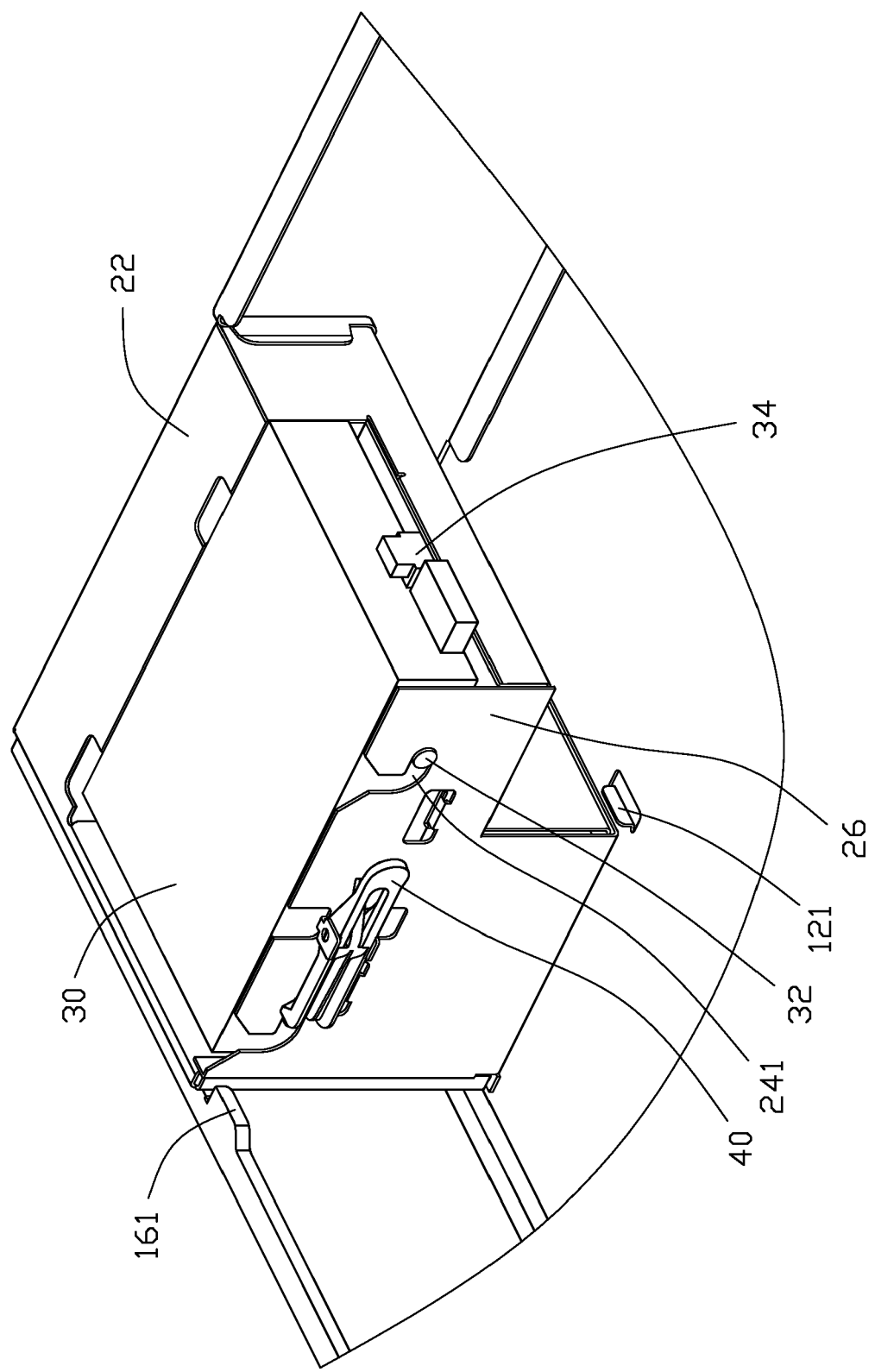
FIG. 3 is an assembled isometric view of the computer of FIG. 1.

Referring to FIG. 3, in assembly, the combination 20 is attached to the chassis 10. The first side panel of the combination 20 engages in the opening 141 of the chassis 10. The first limiting piece 121 of the base panel 12 and the second limiting piece 161 of the side panel 16 of the chassis 10 keep the combination 20 from moving away from the rear panel 14 and the side panel 16. The pivot posts 42 of the securing member 40 engage in the pivot holes 263 of the securing pieces 261 of the second side panel 26 of the combination 20. Thus, the securing member 40 is pivotably attached to the second side panel 26 of the combination 20. The hook 44 of the securing member 40 aligns with one guide slot 241 of the second side panel 26 adjacent to the side panel 16 of the chassis. Another end of the securing member 40 is pressed, and the hook 42 rotatably moves away from the guide slots 241. The fixing posts 32 of the hard disk drive 30 slide into the guide slots 241 respectively. The securing member 40 is released and urged to rotate back to its original position by the resilient piece 46 resisting against the second side panel 26 of the combination 20. The hook 44 of the securing member 40 engages with one of the fixing posts 32 received in the guide slot 241 of the second side panel 26 of the combination 20 adjacent to the side panel 16 of the chassis 10. Thus, the hard disk drive 30 is secured in the storage holder 24 of the combination 20.

In the embodiment, the storage holder 24 includes a closed end adjacent to the side panel 16 of the chassis 10 and an open end opposite to the closed end. When installed, the hard disk drive 30 is put in the holder 24 from the top towards the back but then is slid from the closed end to the open end of the storage holder 24 and securely held in the storage holder 24 by the posts 32 being received in the L-shaped guide slots 241 and prevented from sliding back by the securing member 40. The SATA connector 34 of the hard disk drive 30 is positioned at the open end close to the corresponding SATA connector of the motherboard. Thus, SATA cables are shorter and easily positioned in the chassis 10.

While the present disclosure has been illustrated by the description of embodiments thereof, and while the embodiments have been described in considerable detail, it is not intended to restrict or in any way limit the scope of the appended claims to such details. Additional advantages and modifications within the spirit and scope of the present disclosure will readily appear to those skilled in the art. Therefore, the present disclosure is not limited to the specific details and illustrative examples shown and described.

What is claimed is:

1. A computer, comprising:
   a chassis;
   a hard disk drive comprising a fixing post and at least a connector;

a power supply unit comprising a side panel and defining a storage cavity in a top portion thereof for holding the hard disk drive, a pair of securing pieces protruding from the side panel and being substantially perpendicular to the side panel; and a pivotable member pivotably attached to the pair of securing pieces and located between the pair of securing pieces, and the pivotable member engaging the fixing post to secure the hard disk drive in the storage cavity;

wherein the hard disk drive is capable of sliding out of the storage cavity, the pivotable member is rotatable about an axis.

2. The computer of claim 1, wherein the storage cavity has a closed end and an open end opposite to the closed end, the hard disk drive is capable of sliding from the closed end to the open end to be held in the storage cavity.

3. The computer of claim 2, wherein a Serial Advanced Technology Attachment connector of the hard disk drive is near the open end of the storage cavity.

4. The computer of claim 2, wherein the chassis comprises a first panel and a second panel perpendicularly connected to the first panel, the closed end of the storage cavity is adjacent to the first panel.

5. The computer of claim 4, wherein the second panel defines an opening therein for exposing a first side panel of the power supply unit.

6. The computer of claim 5, wherein the pivotable member is pivotably attached to a second side panel of the power supply unit.

7. The computer of claim 5, wherein at least one guide slot is defined in the second side panel of the power supply unit, the at least one guide slot receives the fixing post.

8. The computer of claim 7, wherein a central portion of the pivotable member is pivotably attached to the power supply unit.

9. The computer of claim 8, wherein the pivotable member comprises a hook bent that engages with the fixing post and a resilient piece that is biased against the second side panel of the power supply unit.

* * * * *